Figure 1:
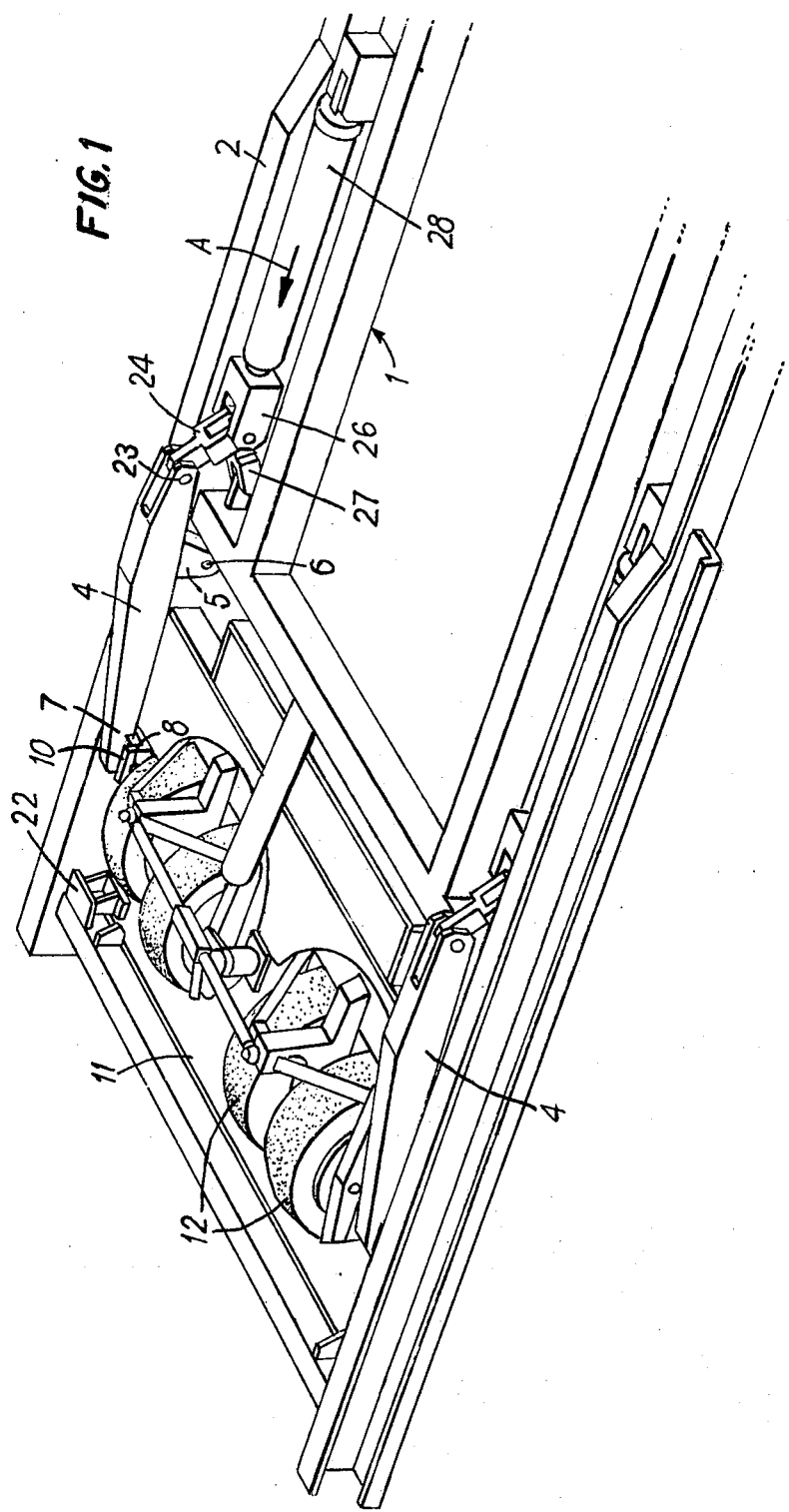

United States Patent [19]

Board

[11] 4,030,770

[45] June 21, 1977

[54] REAR WHEEL JACKING SYSTEM

[75] Inventor: Kenneth B. Board, Stow Maries, England

[73] Assignee: Atel Products Limited, Southend-on-Sea, England

[22] Filed: Oct. 28, 1975

[21] Appl. No.: 626,487

[30] Foreign Application Priority Data

Nov. 1, 1974 United Kingdom ............ 47449/74

[52] U.S. Cl. ............................ 280/43.23; 180/132
[51] Int. Cl.² ....................................... B62D 33/08
[58] Field of Search ........... 214/512, 38 B, 38 BA; 180/132; 280/43.17, 43.23

[56] References Cited

UNITED STATES PATENTS 2,974,972  3/1961  Hassell .................... 214/38 BA X
3,153,544  10/1964  Jung et al. ................... 280/43.23

Primary Examiner—Robert G. Sheridan
Attorney, Agent, or Firm—Lon H. Romanski

[57] ABSTRACT

A cargo loading vehicle for loading aircraft which is designed to accept cargo at a low height above the ground. The vehicle has wheels for traversing which have little ground clearance. Jacking means are provided for jacking the chassis of the vehicle with respect to the wheels to provide increased ground clearance.

9 Claims, 3 Drawing Figures

REAR WHEEL JACKING SYSTEM

This invention relates to cargo loading vehicles and is more particularly, although not exclusively concerned with a vehicle which is suitable for loading aircraft.

It is to be understood that the term loading has been used herein to refer to vehicles which are not only used for loading but also for unloading.

Normally such cargo loading vehicles have to be arranged so that they can accept pallet and container loads at a maximum height above the ground of approximately 20 inches, being the normal standard height for various transporter dollies and the like in the aircraft industry. The vehicles must also be capable of discharging and accepting loads into and from aircraft at their cargo door sill levels which may vary from 10 to 20 feet above ground level.

Vehicles of this kind and with which the invention is concerned normally comprises two lifting platforms, namely a forward lifting platform and a main lifting plateform, the forward lifting plateform being raised to the height of the door sill level whilst the main lifting plateform is that used for raising loads from the ground level up to the door sill height. The two plateforms are arranged to be raised independently of one another and are raised by scissor lift assemblies.

It will be appreciated that in order to keep the maximum height to approximately 20 inches above the ground in the lowered position, problems tend to arise as the underneath of the vehicle tends to be nearer the ground than is convenient to give adequate ground clearance. This is particularly true on aircraft pans where draining slopes and/or guttering some 5 inches deep may be encountered. It is an object of the present invention to overcome this drawback.

A cargo lifting vehicle, according to the present invention, comprises forward and rear sets of wheels supporting a chassis and means for jacking the chassis of the vehicle with respect to a set of wheels to provide increased ground clearance. With this arrangement the vehicle can be transversed without bottoming. It will be appreciated that with these cargo loading vehicles, when in use for loading aircraft, stabilisers are provided to take the lifting loads off the wheels, and the problem referred to above only arises during transversing.

Preferably the jacking means is located adjacent the rear set of wheels and the jacking means may act on a frame carrying the rear wheels. In this case the frame may be located to extend between side chassis members and the jacking means may include a lifting arm acting respectively on each side of the frame.

Each lifting arm may be pivoted at one end to the frame and at the other to an operating member and is also pivotally connected to the adjacent side chassis member. Each lifting arm may be located above the frame and mounted for pivotal movement with respect to the chassis on an extension bracket rigidly connected to the arm and pivotally mounted on the chassis.

Conveniently the lifting arm is actuated by an operating member through a toggle lever. This arrangement thus ensures that the lifting arm is stable in both its raised and lowered positions.

The end of the lifting arm connected to the frame may be connected to it at the mid-point, that is to say the mid-point in the lengthwise direction.

Conveniently the frame is arranged to float between stop members and against which the frame bears in the raised and lowered position of the jacking means, the stop members conveniently comprising resilient pads mounted on brackets secured to the chassis.

Preferably also the set of wheels with which the means for jacking the vehicle is associated are steerable.

The invention may be performed in various ways and one specific embodiment will now be described by way of example with reference to the accompanying drawings in which:-

Figure 2:
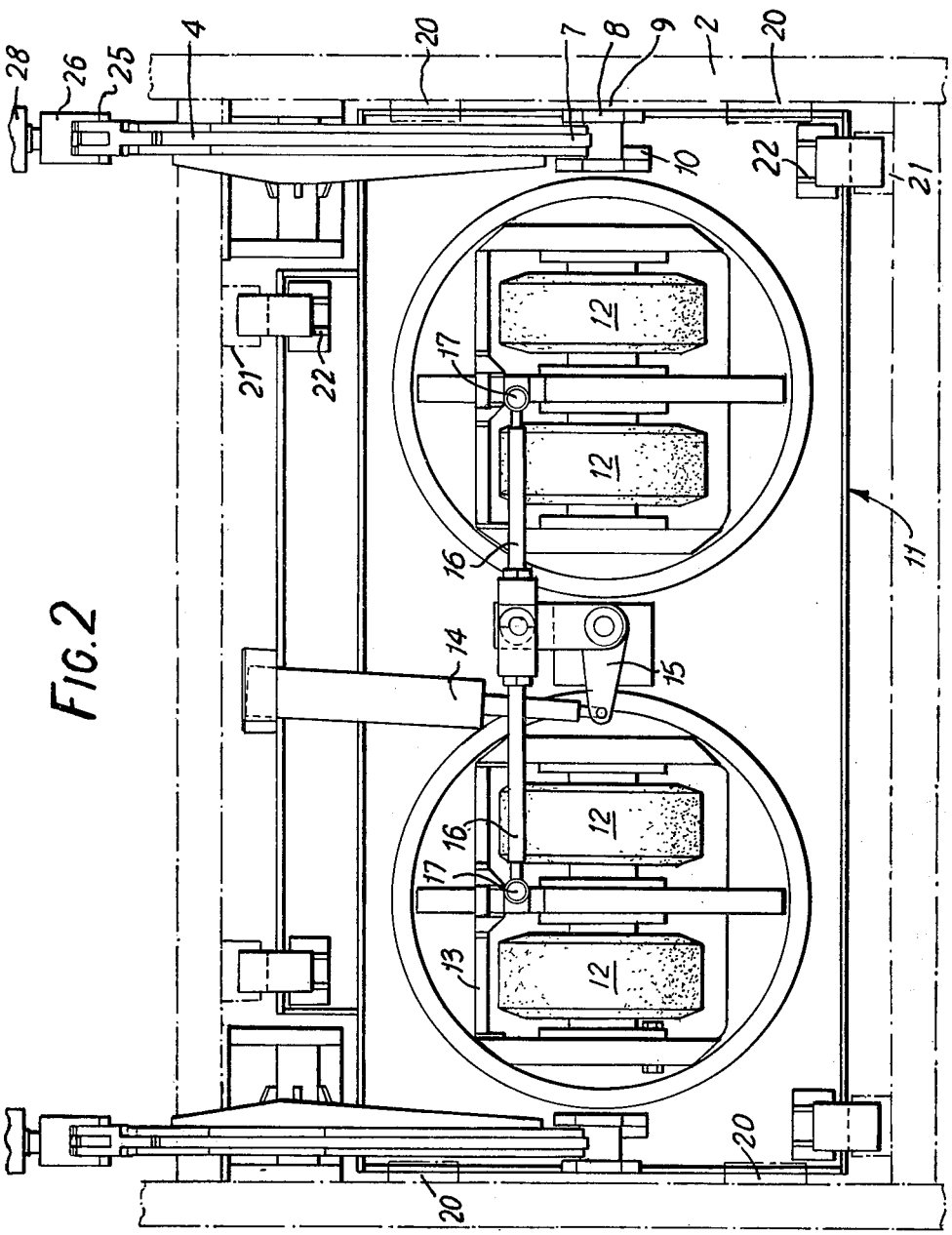
Figure 3:
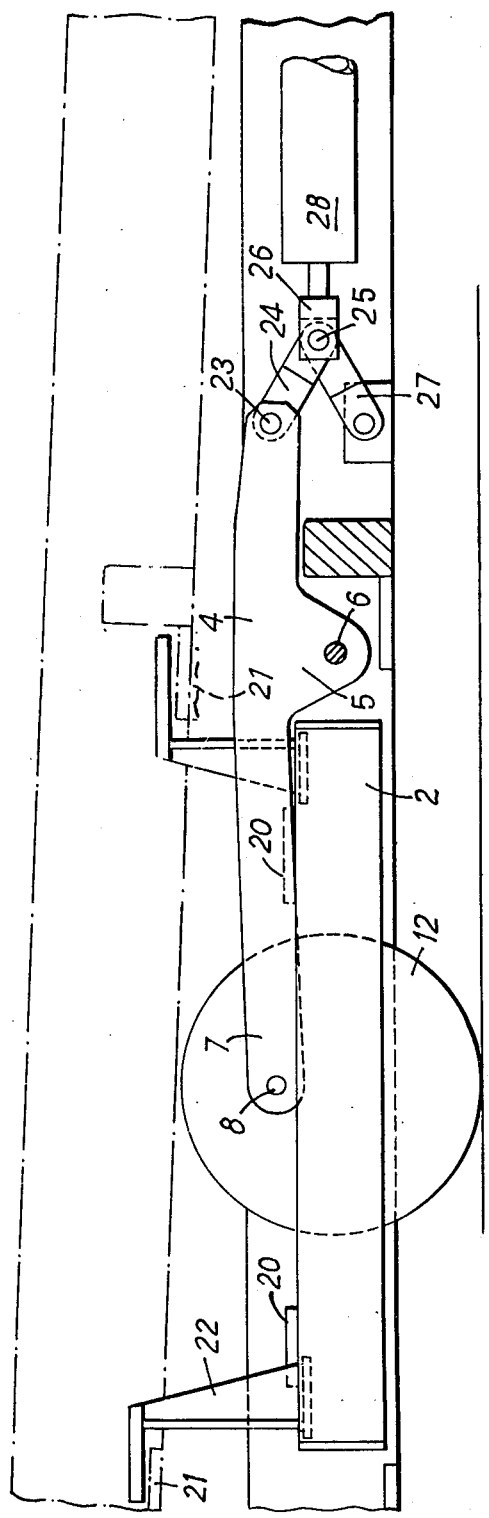

FIG. 1 is a diagrammatic perspective view of the present invention incorporated in a cargo loading vehicle, FIG. 2 is a plan view of the arrangement shown in FIG. 1 and FIG. 3 is an end view of the arrangement shown in FIG. 2.

Although only a portion of the vehicle has been shown it is of the general kind set forth in the present applicant's patent application Ser. No. 560,195, filed Mar. 20, 1975.

As shown in the Figures the cargo loading vehicle has a chassis indicated generally at 1 having outer side chassis members 2 and 3. Pivotally connected to the chassis members 2 and 3 are lifting arms 4 arranged on opposite sides of the vehicle and each of which has a downwardly extending bracket 5 rigidly connected thereto and pivotally connected at 6 to the side chassis members 2 and 3 respectively.

Each of the lifting arms 4 is pivotally connected at its end 7 to a pivot pin 8 on a bracket 10 rigidly secured to the mid-point 9 of the sub-frame 11 which carries wheels arranged in pairs 12 supporting the rear of the vehicle. Each pair of the wheels 12, as shown more clearly in FIG. 2, is mounted in a rotatable frame 13 and which is arranged to be steered from a hydraulic cylinder 14 actuating a bell crank lever 15 which in turn operates track rods 16 pivotally connected to the rotatable frame at 17.

The frame 11 is floating and is movable between a downstop 21 shown more clearly in FIG. 3 and an upperstop 20. The sub-frame is provided with a stop bracket 22 which is arranged to bear against the downstop 21 in the lowered position the frame resting on the upperstop 20 in the raised position.

The other ends (i.e. forward ends) of the lifting arms 4 are provided with a pivot 23 about which pivots one end of a link 24 which has its other end bifurcated and pivoting at 25 in a bifurcated member 26 and also pivoting at 25 in the end of a second link 27 so as the links 24 and 27 form between them a toggle lever arrangement.

In operation, when it is desired to jack the vehicle, fluid is supplied to a hydraulic cylinder 28 from the controls and causes the toggle lever arrangement to move rearwardly in the direction of Arrow 'A' which in turn raises the end of the arm 4. This acts on the chassis and raises this with respect to the wheels which take the load through the brackets 10 the sub-frame 11, and the down stop 21.

The arrangement is such that the vehicle chassis can be raised approximately a further 10 inches at the rear end and this provides an increased clearance above the normal 5 inch ground clearance and will cater for any deflections that occur in the chassis as well as avoiding the obstacles referred to previously. In normal circumstances it is not necessary to jack the front of the vehicle, that is to say the end carrying the forward lifting plateform, as this does not have to accept pallet loads at the height referred to and it is only the main platform which has this height limit applied to it. Thus by jacking up the rear end, which carries the main plateform, adequate ground clearance can be given to the vehicle for transversing purposes.

I claim:

1. A cargo lifting vehicle comprising chassis means, said chassis means comprising a relatively forwardly directed end, a relatively rearwardly directed end, first side frame member means, second side frame member means, said first and second side frame member means comprising and being at generally opposite sides of said chassis means, at least first and second wheel means situated inboard of said side frame member means, rigid support means operatively interconnecting said first and second wheel means to each other and effective to maintain the axes of said first and second wheel means elevationally fixed with respect to each other, said rigid support means being situated inboard of said side frame member means as to have the ability of upward and downward movement relative to said side frame member means, linkage means operatively connected to said rigid support means and to said side frame member means for movement relative to both said rigid support means ands said side frame member means, and power applying means operatively connected to said linkage means, said power applying means being effective when energized to cause selective upward and downward movement of said rigid support means and wheel means relative to said side frame member means.

2. A cargo lifting vehicle according to claim 1 wherein said first and second wheel means and said rigid support means are each located at least near said rearward end, wherein said power applying means is located relatively forwardly of said rigid support means, and wherein said linkage means is operatively pivotally connected to said side frame member at a location generally forwardly of said wheel means and rearwardly of said power applying means 3. A cargo lifting vehicle according to claim 2, wherein said rigid support means comprises a frame structure generally circumscribing said first and second wheel means generally in a plane parallel to the axes of said first and second wheel means and generally parallel to said side frame member means.

4. A cargo lifting vehicle according to claim 3 wherein said linkage means comprises a first lifting arm lever operatively pivotally connected to said first side frame member means and pivotally connected to a corresponding first juxtaposed side of said frame structure, and a second lifting arm lever operatively pivotally connected to said second side frame member means and pivotally connected to a corresponding second juxtaposed side of said frame structure.

5. A cargo lifting vehicle according to claim 4, and further comprising first and second bracket members carried by said frame structure as to be extending generally upwardly therefrom, and wherein said first and second lifting arm levers are each located generally above said frame structure, and wherein first and second pivot pins operatively respectively interconnected said first and second bracket members to said first and second lifting arm levers.

6. A cargo lifting vehicle according to claim 3, and further comprising first and second stop means respectively carried by said chassis, said first and second stop means being effective to operatively abut against said frame structure as to thereby established a maximum relatively elevated position of said chassis and a maximum relatively lowered position of said chassis.

7. A cargo lifting vehicle according to claim 6 wherein said first and second stop means respectively comprise first and second bracket members fixedly secured to said chassis, and first and second resilient pads respectively mounted to said first and second bracket members.

8. A cargo lifting vehicle according to claim 3 wherein said first and second wheel means respectively comprise a first plurality of first vehicle supporting wheels and a second plurality of second vehicle supporting wheels, wherein said frame structure comprises first and second aperture means formed therethrough and spaced from each other generally transversely of said chassis, wherein said first aperture means is effective for receiving said first wheels therein, wherein said second aperture means is effective for receiving said second plurality of second wheels therein, and means effective for causing steerable rotation of said first and second plurality of first and second wheels with the axis of said steerable rotation being substantially normal to said frame structure.

9. A cargo lifting vehicle according to claim 1, wherein said at least first and second wheel means are steerably mounted within said rigid support structure.

* * * * *